(12) United States Patent
Hightower

(10) Patent No.: US 9,807,977 B2
(45) Date of Patent: Nov. 7, 2017

(54) PET GROOMING GLOVE PROVIDING FLUID SUPPLY

(71) Applicant: Linda Hightower, Orlando, FL (US)

(72) Inventor: Linda Hightower, Orlando, FL (US)

( * ) Notice: Subject to any disclaimer, the term of this patent is extended or adjusted under 35 U.S.C. 154(b) by 99 days.

(21) Appl. No.: 14/850,959

(22) Filed: Sep. 11, 2015

(65) Prior Publication Data

US 2016/0073611 A1    Mar. 17, 2016

Related U.S. Application Data

(60) Provisional application No. 62/050,074, filed on Sep. 12, 2014.

(51) Int. Cl.
*A01K 13/00* (2006.01)

(52) U.S. Cl.
CPC .......... *A01K 13/001* (2013.01); *A01K 13/003* (2013.01)

(58) Field of Classification Search
CPC .... A01K 13/00; A01K 13/001; A01K 13/003; A45D 19/00; A45D 19/02; A45D 2019/0033; A45D 2019/0041; A45D 2019/005; A45D 2019/0058; A45D 2019/0066; A45D 2019/0083; A45D 2019/0091; A45D 24/22; A45D 24/26; A45D 24/28; A46B 5/04; A47K 7/00; A47K 7/02; A47K 7/04; A47K 7/043; A47K 7/046
USPC ........ 119/602, 603, 604, 656; 401/7; 15/227
See application file for complete search history.

(56) References Cited

U.S. PATENT DOCUMENTS

| 836,181 | A |   | 11/1906 | Cray |   |
|---|---|---|---|---|---|
| 1,533,732 | A |   | 7/1924 | Frost |   |
| 1,530,327 | A | * | 3/1925 | Redlick | A47L 13/19 |
|   |   |   |   |   | 15/227 |
| 2,405,154 | A | * | 8/1946 | Logan | A01J 1/00 |
|   |   |   |   |   | 15/227 |
| 2,562,418 | A | * | 7/1951 | Enrico | A61H 7/003 |
|   |   |   |   |   | 15/188 |
| 2,663,890 | A | * | 12/1953 | Sullings | A47L 13/18 |
|   |   |   |   |   | 15/227 |
| 3,701,604 | A |   | 10/1972 | Holroyd |   |
| 3,778,172 | A |   | 12/1973 | Myren |   |
| 4,799,456 | A | * | 1/1989 | Young | A01K 13/002 |
|   |   |   |   |   | 119/603 |
| 4,903,864 | A | * | 2/1990 | Sirhan | A63H 37/00 |
|   |   |   |   |   | 2/160 |
| 5,048,759 | A |   | 9/1991 | Mazziotta |   |

(Continued)

*Primary Examiner* — Monica Williams
*Assistant Examiner* — Brady W Frazier
(74) *Attorney, Agent, or Firm* — The Roy Gross Law Firm, LLC; Roy Gross

(57) ABSTRACT

The present invention is a distinctive pet grooming glove which provides a fluid supply to allow users to wash and/or groom pets using a single gloved hand while a stream of fluid (such as water) flows from the glove. The Pet Grooming Glove includes an attachment port for attaching a source of primary fluid (such as water) as well as apertures in the glove which allow the primary fluid to flow from the primary supply source port to the palm of the glove. Additionally the Pet Grooming Glove includes an attachment port for attaching a source of secondary fluid (such as shampoo) as well as apertures in the glove which allow the secondary fluid to flow from the secondary fluid supply port to the palm of the glove.

12 Claims, 10 Drawing Sheets

(56) References Cited

U.S. PATENT DOCUMENTS

| | | | | |
|---|---|---|---|---|
| 5,120,304 | A * | 6/1992 | Sasaki | A61B 42/00 |
| | | | | 2/159 |
| 5,169,251 | A | 12/1992 | Davis | |
| 5,722,349 | A * | 3/1998 | Wolgamuth | A41D 19/0079 |
| | | | | 119/632 |
| 6,109,214 | A * | 8/2000 | Rampersad | A01K 13/002 |
| | | | | 119/600 |
| 6,409,688 | B1 | 6/2002 | Hennenfent | |
| 7,478,768 | B2 * | 1/2009 | Yip | A61H 37/00 |
| | | | | 15/227 |
| 7,568,639 | B2 * | 8/2009 | Yip | A45D 27/08 |
| | | | | 222/175 |
| 8,469,619 | B1 * | 6/2013 | Lewis | A46B 5/04 |
| | | | | 401/7 |
| 8,555,819 | B1 | 10/2013 | McFarland | |
| 8,794,189 | B1 * | 8/2014 | Dahlquist | A46B 5/04 |
| | | | | 119/650 |
| 9,167,948 | B2 * | 10/2015 | Tucker | A47L 13/19 |
| 2005/0072374 | A1 | 4/2005 | Claire | |
| 2006/0288954 | A1 * | 12/2006 | Graunstadt | A47K 7/03 |
| | | | | 119/652 |
| 2008/0178823 | A1 * | 7/2008 | Hurwitz | A01K 13/002 |
| | | | | 119/603 |
| 2010/0282182 | A1 * | 11/2010 | Moinester | A01K 13/001 |
| | | | | 119/604 |
| 2012/0189371 | A1 | 7/2012 | Morelli | |
| 2013/0269136 | A1 * | 10/2013 | Boulton | A41D 19/01594 |
| | | | | 15/227 |
| 2013/0305998 | A1 * | 11/2013 | Brown | A01K 13/001 |
| | | | | 119/603 |

\* cited by examiner

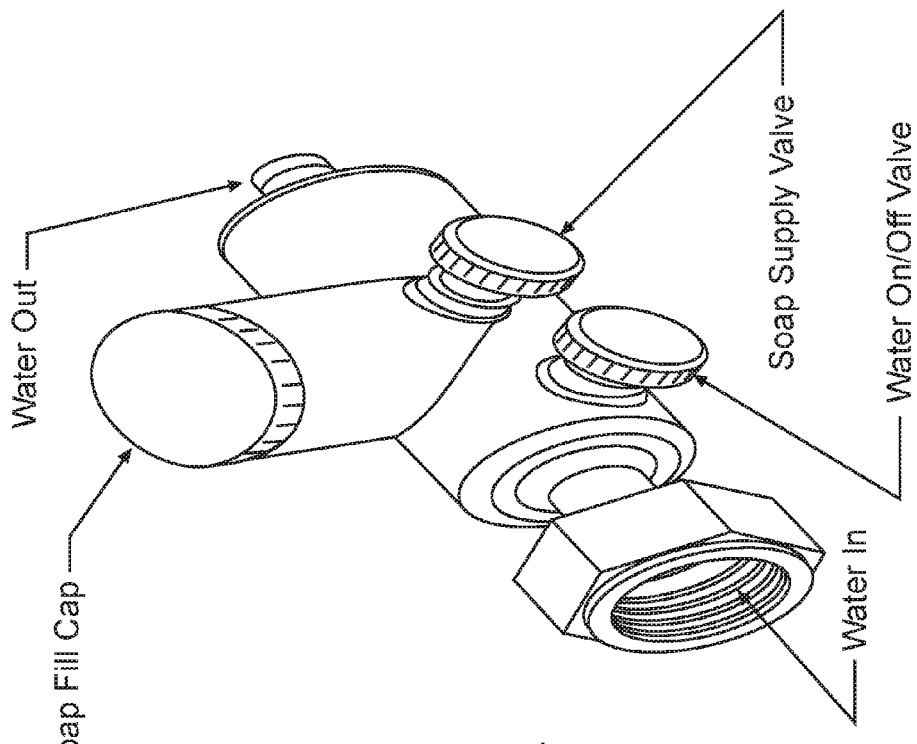
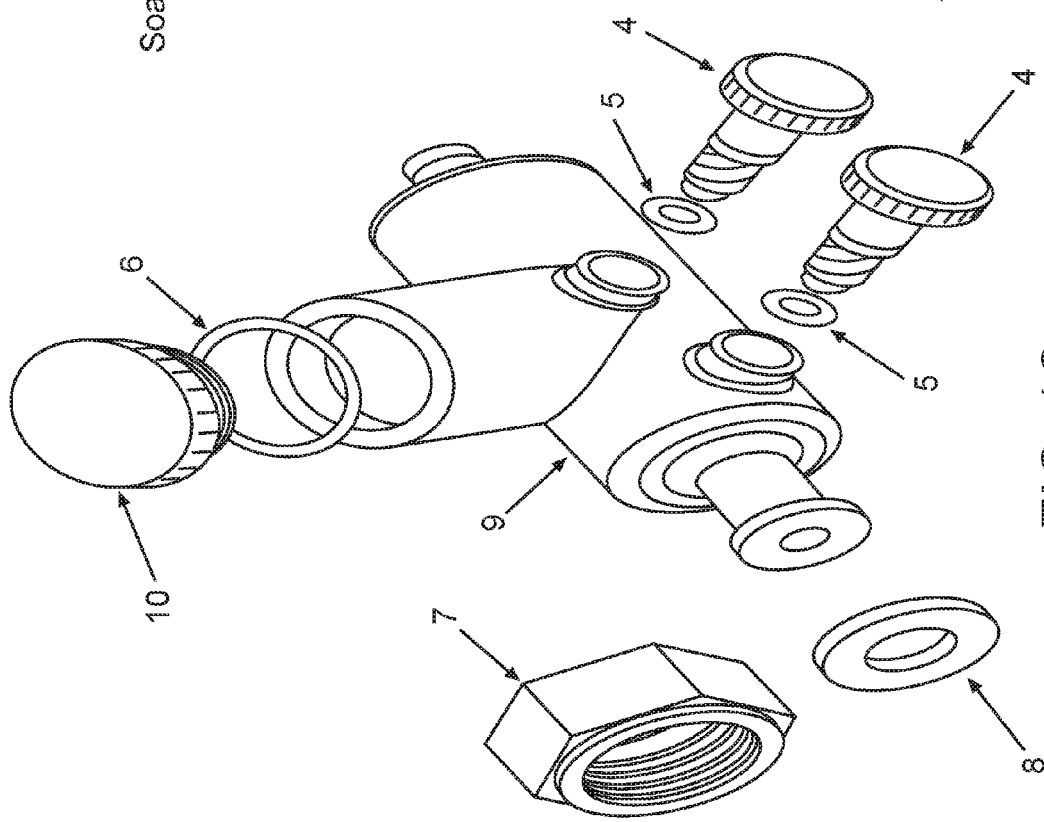

PET GROOMING GLOVE PROVIDING FLUID SUPPLY

CROSS REFERENCE TO RELATED APPLICATIONS

This application claims the benefit of Provisional Patent Application 62/050,074, filed Sep. 12, 2014.

BACKGROUND OF THE INVENTION

The invention provides a pet grooming glove which provides a fluid supply to allow users to wash pets using a single gloved hand while a stream of fluid (such as water) flows from the glove.

SUMMARY OF THE INVENTION

The present invention is a distinctive pet grooming glove which provides a fluid supply to allow users to wash and/or groom pets using a single gloved hand while a stream of fluid (such as water) flows from the glove. The Pet Grooming Glove includes an attachment port for attaching a source of primary fluid (such as water) as well as apertures in the glove which allow the primary fluid to flow from the primary supply source port to the palm of the glove. Additionally the instant invention includes an attachment port for attaching a source of secondary fluid (such as shampoo) as well as apertures in the glove which allow the secondary fluid to flow from the secondary fluid supply port to the palm of the glove.

BRIEF DESCRIPTION OF THE DRAWINGS

FIG. 1C shows exploded view of the fluid dispenser.

FIG. 1D shows an assembled view of the fluid dispenser.

DETAILED DESCRIPTION

The present invention is a pet grooming glove 1 (also referred to herein as a fluid supplying glove 100) as shown in preferred embodiment of the invention in FIGS. 1A-1H.

Figure 1:
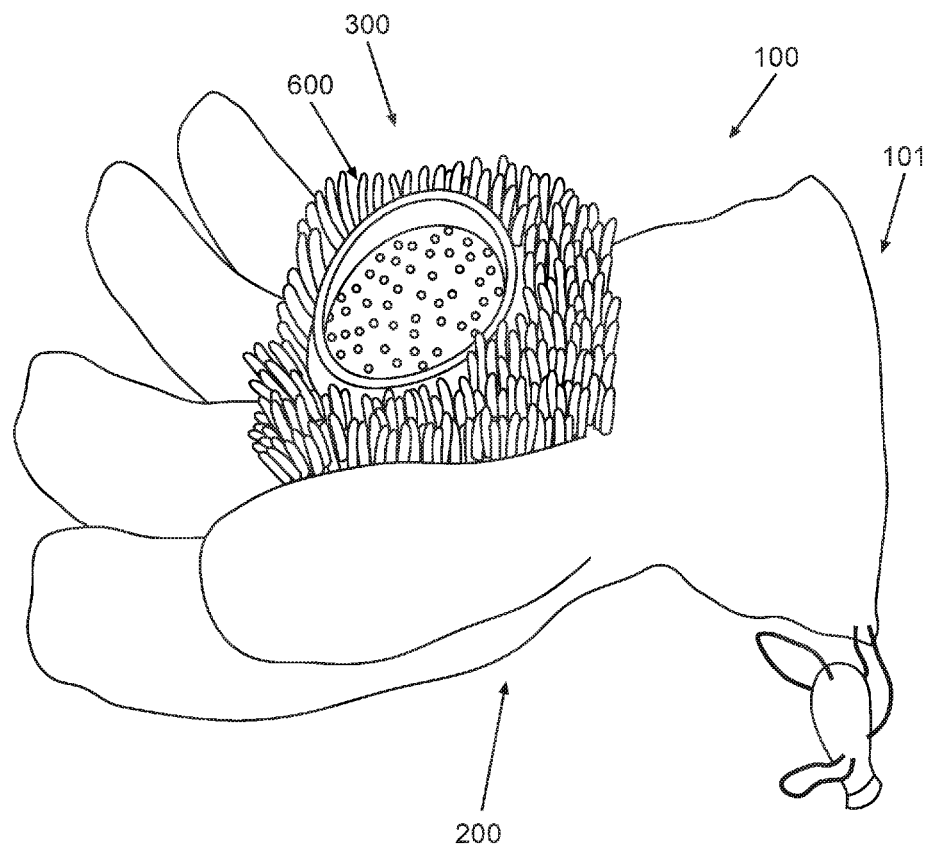
FIG. 1 shows a front outer perspective view of the pet grooming glove.
Figure 1A:
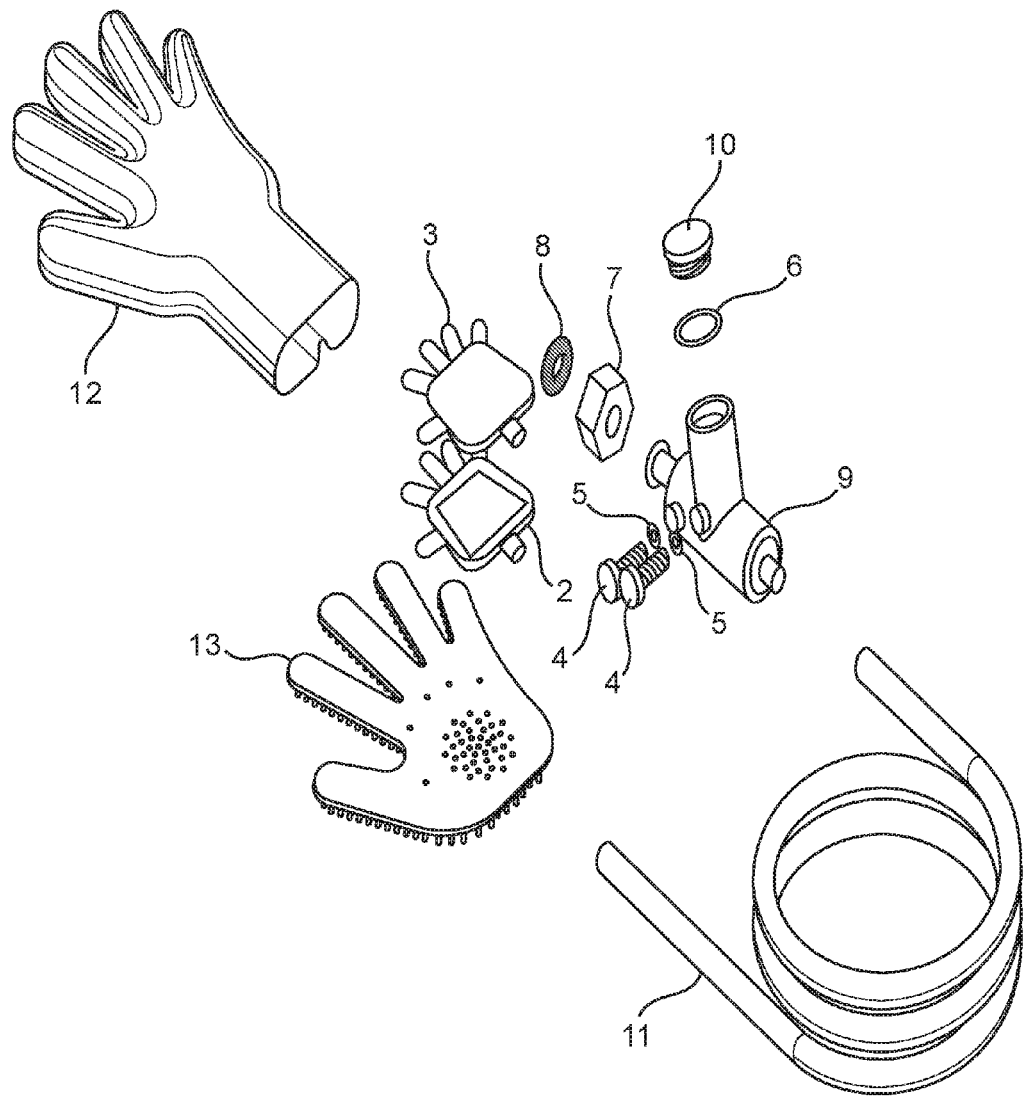
FIG. 1A shows an exploded view of the pet grooming glove.

As shown in FIG. 1A the pet grooming glove 1 includes a first showerhead part 2 positioned adjacent a second showerhead part 3, wherein the first showerhead part 2 includes a plurality of holes for allowing fluid to exit the pet grooming glove at selected areas such as the palm region of the pet grooming glove 1.

The pet grooming glove 1 further includes a valve 4, a pair of first rings 5, a second ring 6, a hose nut 7, a washer 8, a fluid dispenser 9, a dispenser cap 10, a hose 11, a glove 12, and a massage pad 13 having a plurality of protrusions 13A (such as bristles) and a plurality of openings 13B positioned near the palm of the massage pad 13. As shown in the assembled view 1B of the pet grooming glove, the above elements are brought together to form the pet grooming glove 1B (or fluid supplying glove 100).

Figure 1B:
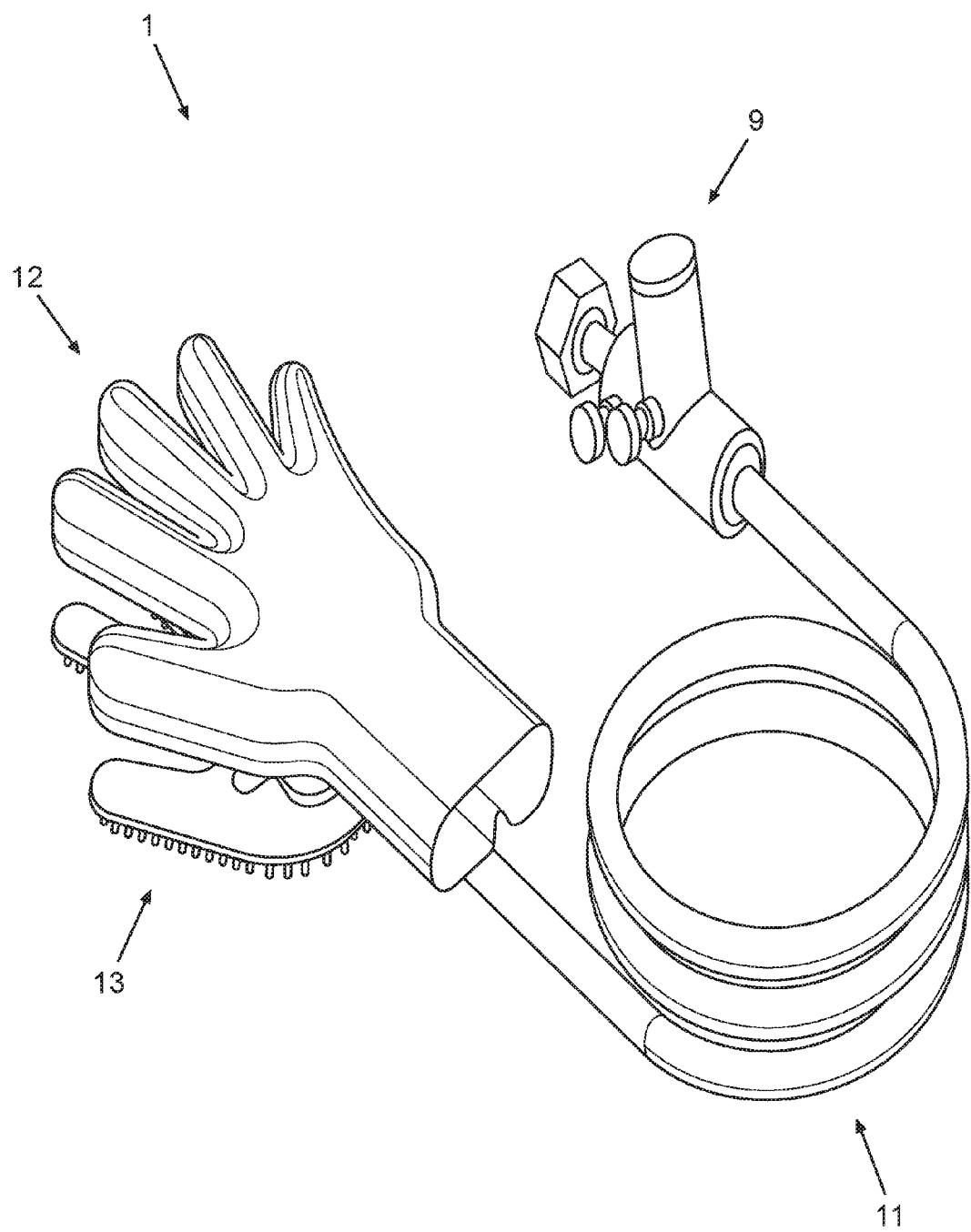
FIG. 1B shows an assembled view of the pet grooming glove.
Figure 1E:
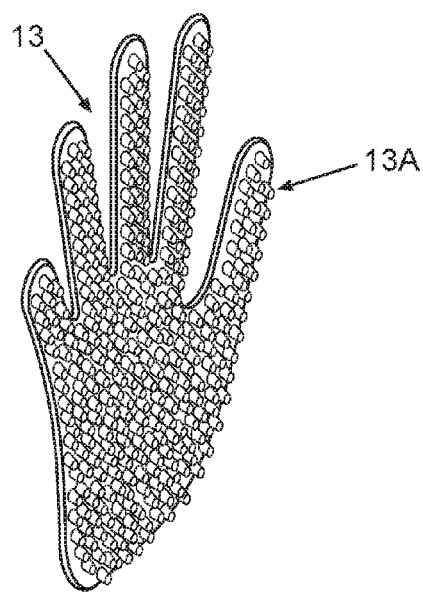
FIG. 1E shows a view of the massage pad.
Figure 1F:
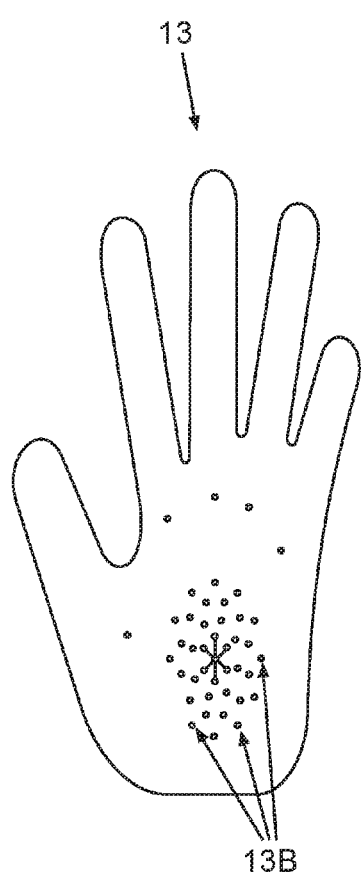
FIG. 1F shows a view of the massage pad.
Figure 1G:
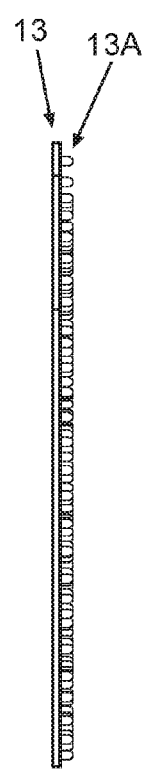
FIG. 1G shows a view of the massage pad.
Figure 1H:
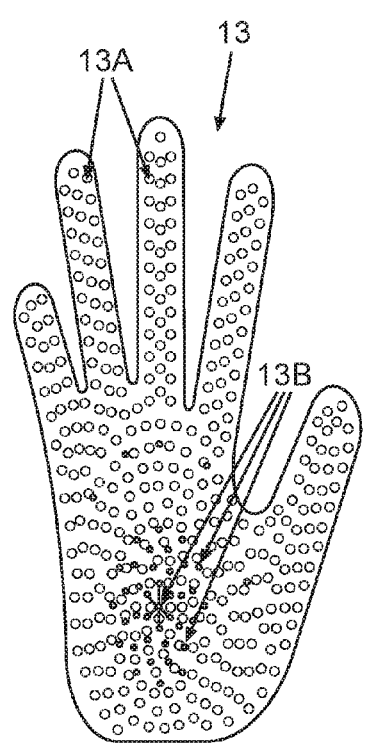
FIG. 1H shows a view of the massage pad.

In FIG. 1B the glove 12 and massage pad 13 are combined together to direct fluid flowing in the dispenser 9 to exit the pet grooming glove 1 at the palm region of the massage pad 13.

As shown in FIG. 1D, the dispenser includes a variety of fluid input, output, and control components such as a Water In Port, a Water Out Port, a Water On/Off Valve, as well as a Soap Fill Cap. These features allow the users to increase, decrease, or stop fluid (such as water) flow from the fluid dispenser 9 to the massage pad 13. For example water provided from a source such as a house water spigot enters the pet grooming glove dispenser at the Water In Port and exits at the pet grooming glove dispenser 9 at the Water Out Port). The Soap Fill Cap allows users to add a solution (such as soap or shampoo) which the fluid dispenser 9 mixes with the fluid provided by the Water In Port and the fluid combination exits the Water Out Port, flows through the hose 11, and exits the pet grooming glove 1 via the plurality of holes 3A in second showerhead part 3 and the plurality of openings 13B in massage pad 13. This fluid or fluid and soap combination is provided using a single gloved hand thereby freeing the user to use his/her other hand to calm, cleanse, restrain, or otherwise care for the pet being groomed.

An alternate embodiment of the invention, as shown at least in FIGS. 1-12 presents fluid supplying glove 100 (also referred to herein as a pet grooming glove 1). The fluid supplying glove/pet grooming glove provides at least one fluid supply to at least the palm area of the glove and includes a first outer layer 200 in fluid sealed connection to a second outer layer 300 with an opening 101 between the layers to allow entry of a user's hand (or any suitable structure). The first outer layer 200 is positioned to cover the back of a users hand and fingers whereas the second outer layer 300 is positioned to cover the palm and fingers of a user as shown in at least FIGS. 1-8.

The pet grooming glove 100 further includes a first fluid supply port 400 which extends through an outer layer (200, 300), or as shown in at least FIGS. 2-6, at a junction of the outer layers (200, 300). In the alternate embodiment the first fluid supply port 400 is adapted for connection to a standard garden hose however port 400 may also be adapted for connection to other fluid supply sources as applicable.

The pet grooming glove 100 may include a second fluid supply port 500 which as shown in at least FIGS. 2, 4-6, can be positioned through an outer layer (200, 300) or can be positioned at a junction of the outer layers (200, 300). In the alternate embodiment the second fluid supply port 500 is adapted for connection to suitable fluid supply sources as applicable, including a standard garden hose.

The pet grooming glove 100 further includes bristles 600 positioned primarily on the second outer layer 300. When washing pets the bristles 600 are stroked across the hair and skin of the pet in a brushing, rubbing, or scrubbing motion to dislodge debris from the pet. The bristles 600 may be provided only in the palm area or they may also be provided in areas such as the areas where user's fingers are positioned. Additionally the bristles may be provided over the entire pet grooming glove 100.

Figure 2:
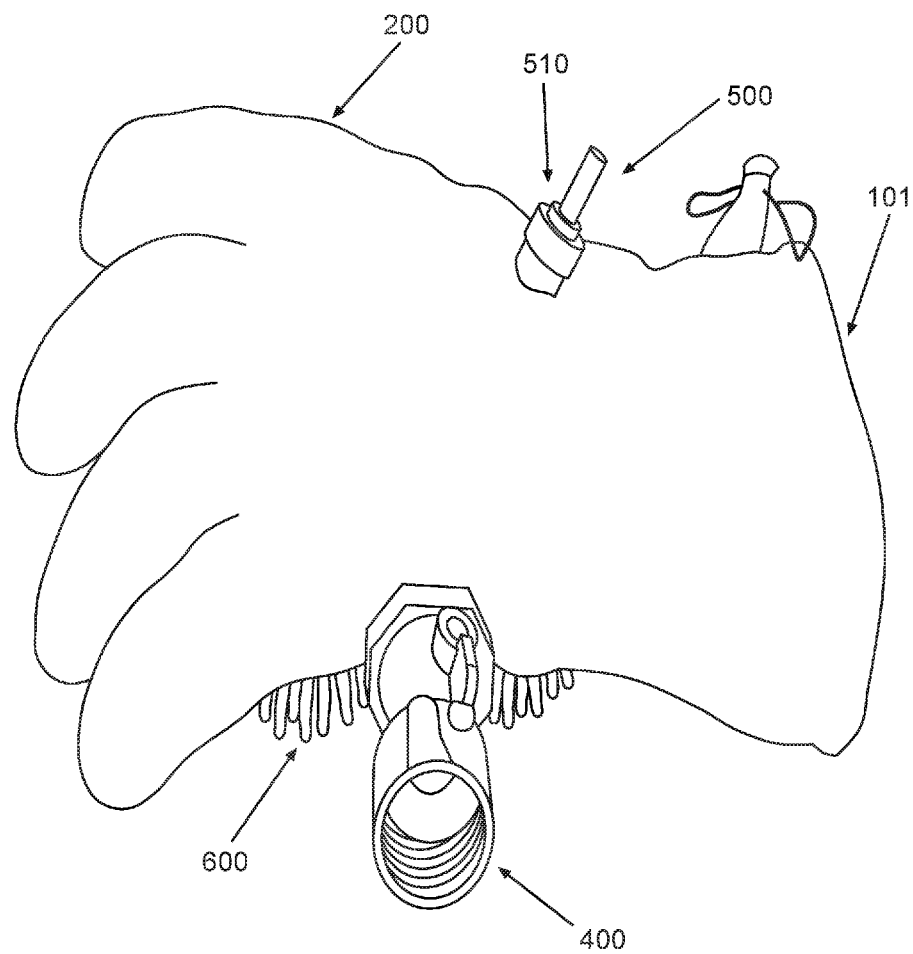
FIG. 2 shows a rear outer perspective view of the pet grooming glove.
Figure 3:
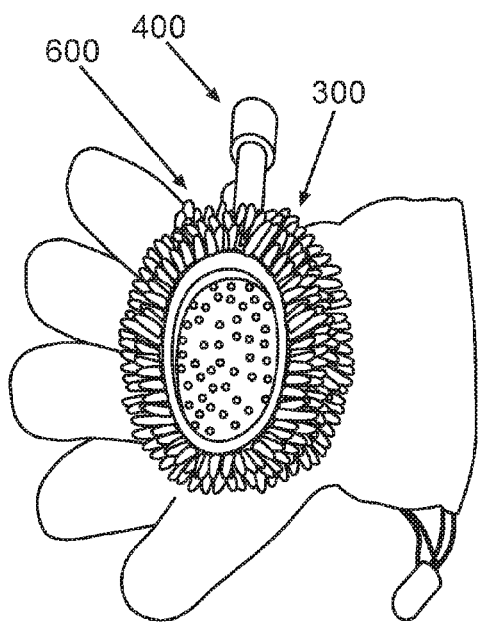
FIG. 3 shows a front outer perspective view of the pet grooming glove.
Figure 4:
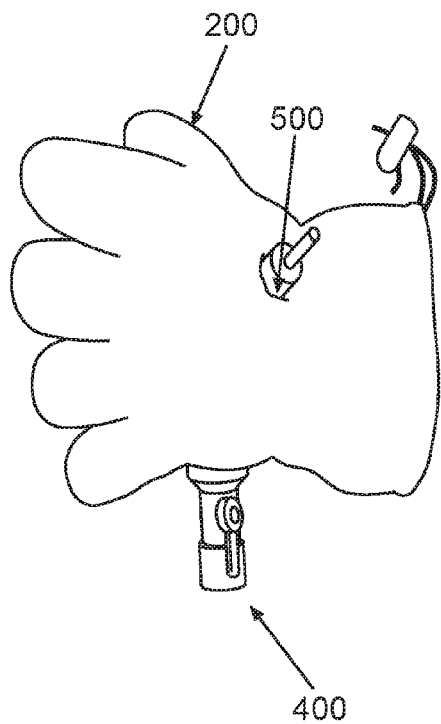
FIG. 4 shows a rear outer perspective view of the pet grooming glove.
Figure 5:
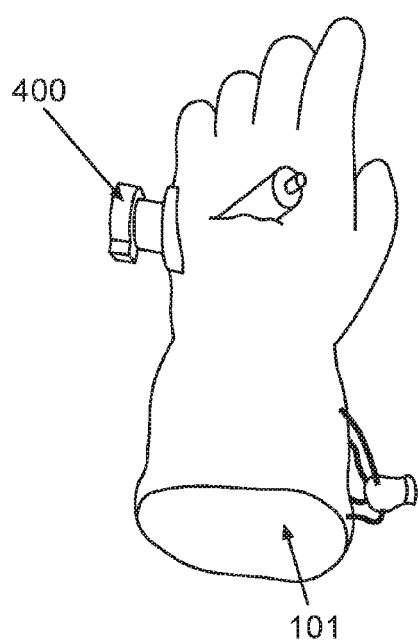
FIG. 5 shows a rear outer perspective view of the pet grooming glove.
Figure 6:
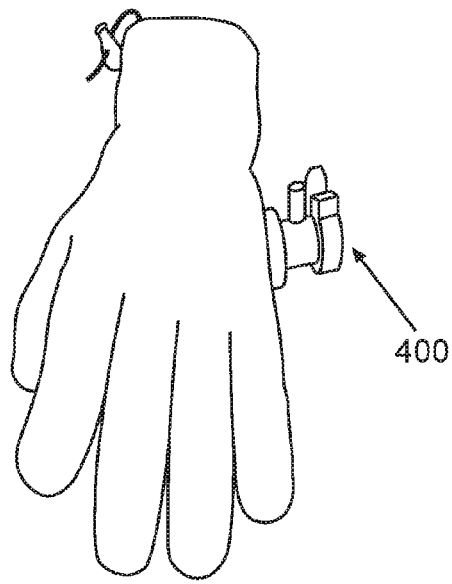
FIG. 6 shows a rear outer perspective view of the pet grooming glove.
Figure 7:
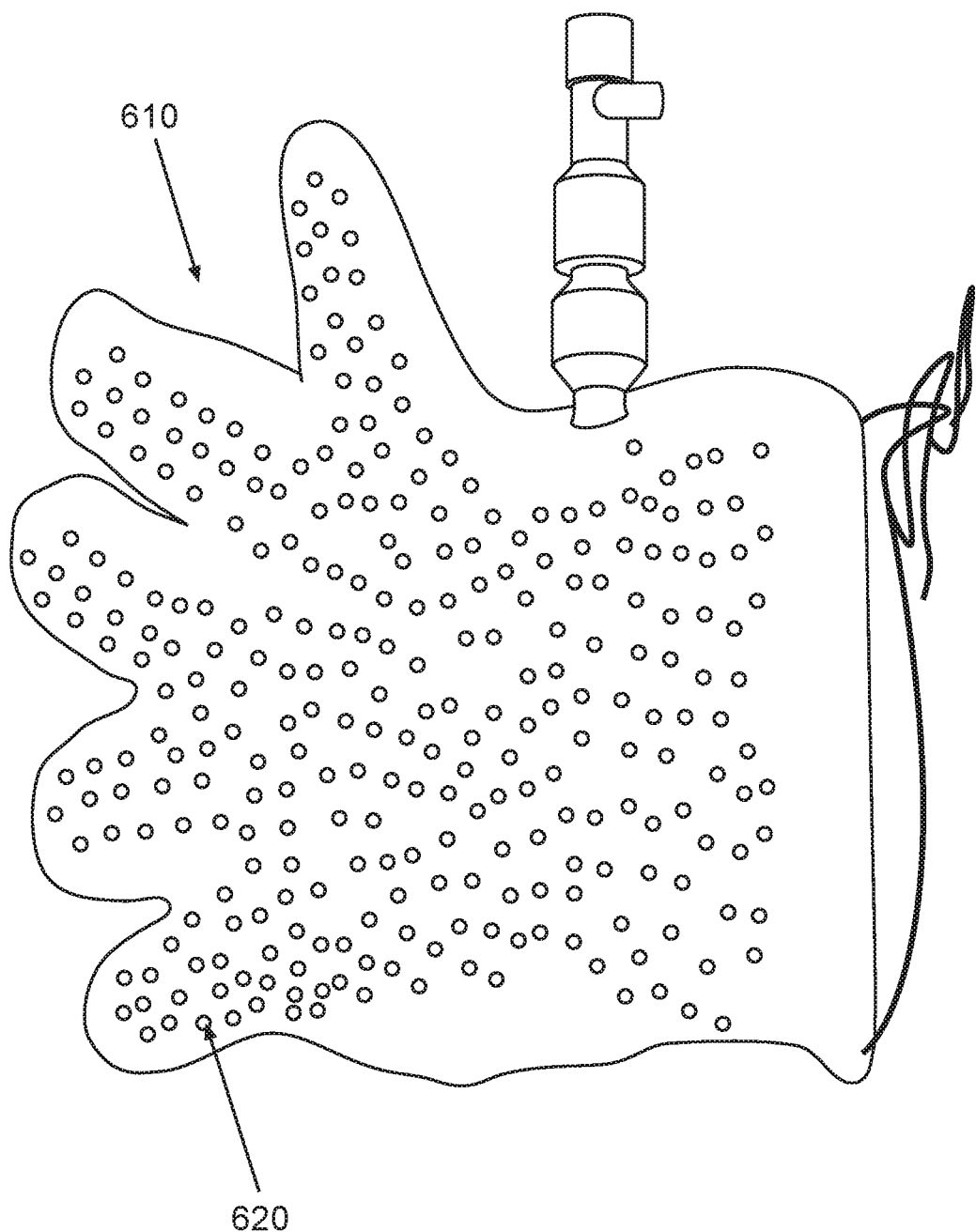
FIG. 7 shows a view of the diffusion later with holes and port attached.

In the alternate embodiment shown at least in FIGS. 1-3, the bristles 600 are made of rubber or plastic however it is anticipated the bristles 600 may be made of any suitable material including chemically stable materials, composite materials, and natural materials. It is further anticipated the cross-sectional diameter and length of the bristles 600 will vary depending on the desired brushing capabilities needed. For example, if a pet has short hair then a pet grooming glove 100 having relatively short bristles would be selected as most suitable. In contrast, if a pet has long hair then a pet grooming glove 100 having relatively long bristles would be selected as most suitable.

Further, the bristles 600 may have a diameter which allows openings (not shown) to be provided within the bristles so that the applicable fluid (primary and/or secondary) can exit the bristle openings (not shown) and be applied to the hair or skin of the pet during brushing, rubbing, or scrubbing. In this configuration the bristle openings (not shown) are in fluid communication with the applicable fluid (primary and/or secondary).

At least in the palm area of the second outer layer 300, the bristles 600 extend from a bristle support layer 610 which includes bristle support layer holes 620 as shown at least in FIGS. 1, 3, 7, 8 and 11. The bristle support layer 610 also serves as a fluid diffusion layer and the bristle support layer holes 620 provide the outlets for the inputted fluids. The bristles 600, at least in the palm area, may be a removable pad which is attached to the bristle support layer 610 such as with hook and loop type fasteners (not shown). This allows users to remove and replace the pad having the bristles 600 if they wear down from usage. Additionally this allows a variety of cross-sectional diameter and length of the bristles 600 to be used interchangeably with the pet grooming glove 100 so that a variety of pets can be groomed. Users would simply peel off one bristle pad 600 and put on a replacement bristle pad 600 in its place.

The removable bristle pad 600 may also be secured to the second outer layer 300 via a slide structure (not shown) which allows the bristle pad 600 to be slide into and removed from a use position, at least in the palm area of the pet grooming glove 100.

Further, Ziploc™ type fastening elements (not shown) may be used to removably secure the bristle pad 600 to the second outer layer 300.

As discussed above the first fluid supply port 400 extends through at least one outer layer (200, 300), preferably at a junction of the outer layers (200, 300). Fluid (such as water) entering the first fluid supply port 400 is injected into the region between the outer layers (200, 300) and exits the pet grooming glove 100 through the bristle support layer holes 620.

Figure 8:
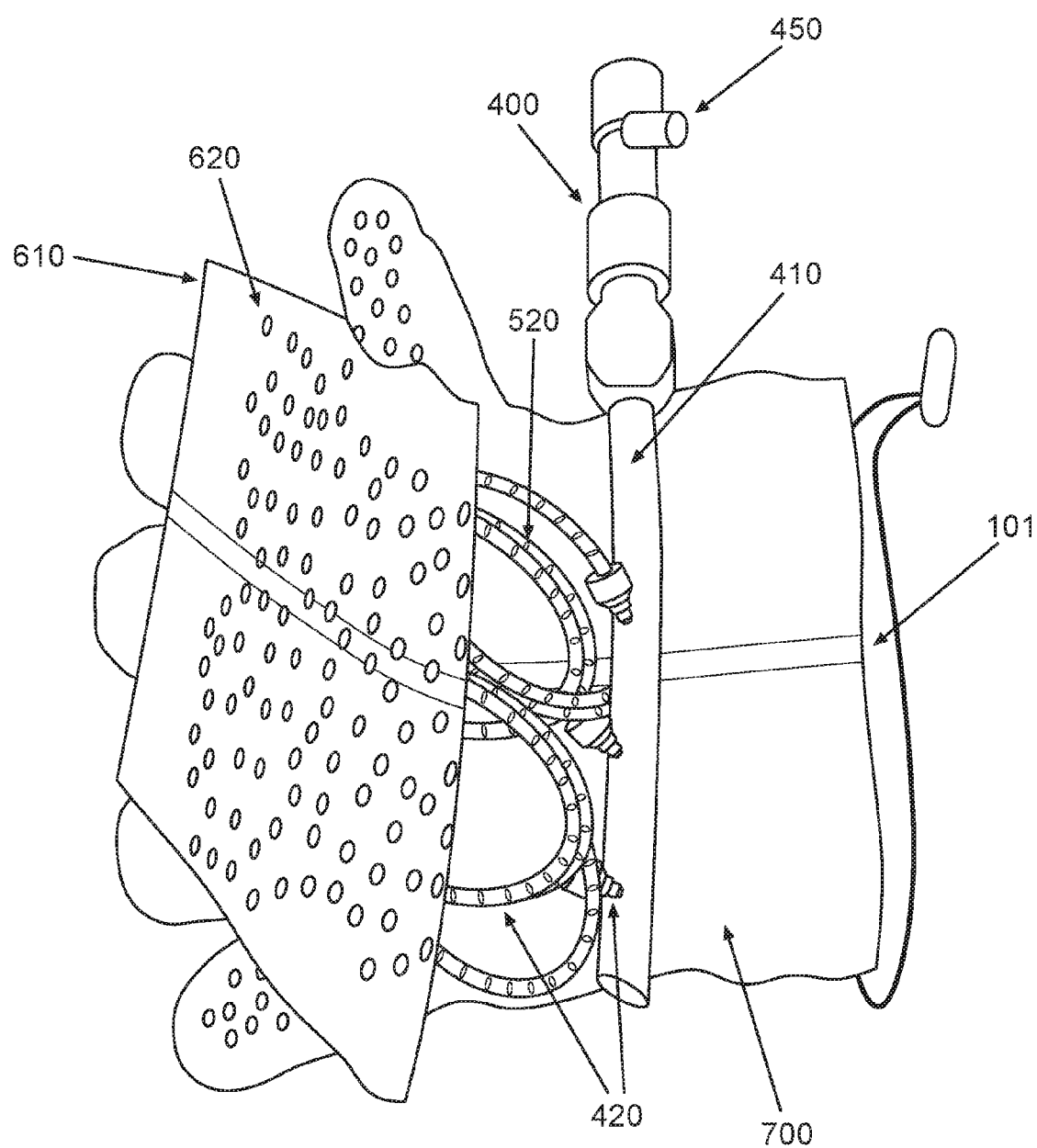
FIG. 8 shows the diffusion layer port and tubing.
Figure 9:
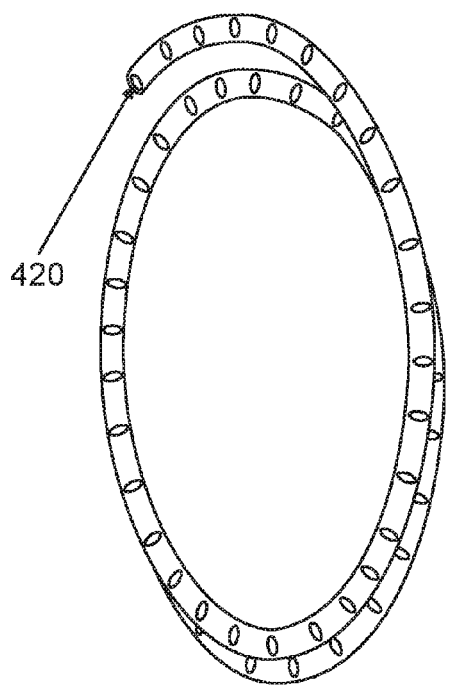
FIG. 9 shows the diffusion tubing.

As shown in FIG. 8, in the alternate embodiment a first fluid supply port baffle 410 routes the fluid from the first fluid supply port 400 to the bristle support layer holes 620 to ensure fluid does not merely accumulate within the region between the outer layers (200, 300) and possibly cause the pet grooming glove 100 to swell and rupture.

Further as shown in FIG. 8, the first fluid supply port baffle 410 may include first fluid supply port fluid routers 420, such as perforated tubes, tube connectors, barbed fitting Tees, and other known fluid handling elements, to more precisely guide fluid to the bristle support layer holes 620.

The first fluid supply port 400 may also include a fluid supply port valve 450 to control the flow of fluid into the pet grooming glove 100.

The first fluid supply port 400 elements may be made integral either or both of the outer layers (200, 300).

As discussed above the second fluid supply port 500 which as shown in at least FIGS. 2, 4-6, can be positioned through an outer layer (200, 300). The second fluid supply port 500 includes a removable fluid reservoir 510 to hold liquids, powders, or gels such as the shampoo or medication which is to be applied to the pet during washing and/or grooming. The removable fluid reservoir 510 may be attached or disconnected via a threaded connection, quick disconnect connections, or other known releasable attachment methods.

The removable fluid reservoir 510 may be positioned anywhere on the glove or may be provided as a separately attached component. The removable fluid reservoir 510 may include a single or multiple chambers to store and deliver fluid as desired. For example, the user may twist or press a portion of the removable fluid reservoir 510 to place a selected chamber in fluid communication with the first fluid supply port baffle 410 or to place all chambers of the removable fluid reservoir 510 in fluid communication with the first fluid supply port baffle 410. The removable fluid reservoir 510 may include at least one access port (not shown) to allow users to refill it while in use washing a pet or at least one access port may be provided to refill the removable fluid reservoir 510 at a separate time.

As shown at least in FIG. 8, the second fluid supply port 500 (not visible) may include fluid supply port fluid routers 520, such as perforated tubes, tube connectors, barbed fitting Tees, and other known fluid handling elements, to put the second fluid supply port 500 in fluid communication with the first fluid supply port 400 and the bristle support layer holes 620.

The second fluid supply port 500 elements may be made integral either or both of the outer layers (200, 300) and or integral with the first fluid supply port 400 elements. The second fluid supply port 500 may be made integral with any other portion of the glove.

Further, additional removable fluid reservoirs (not shown) may be provided in series with or in parallel with removable fluid reservoir 510 or the first fluid supply port 400 or the second fluid supply port 500 or simultaneously with all fluid supply reservoirs.

As shown at least in FIG. 8, the pet grooming glove 100, may include a protective insert 700 to isolate the user's hand from the first and second fluid supply port elements (400, 500). The protective insert 700 is attached to the interiors of the outer layers (200, 300) and the first and second fluid supply port elements (400, 500) are covered by the protective insert 700 thereby forming a region where no fluid or port elements can contact the user.

Figure 10:
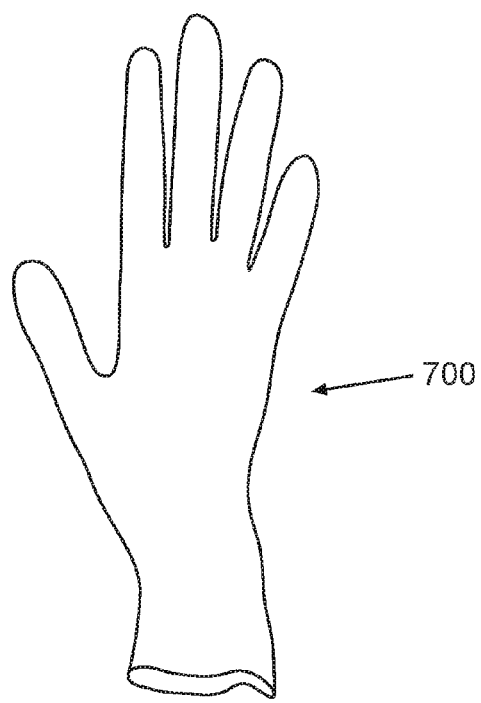
FIG. 10 shows the diffusion layer without holes.
Figure 11:
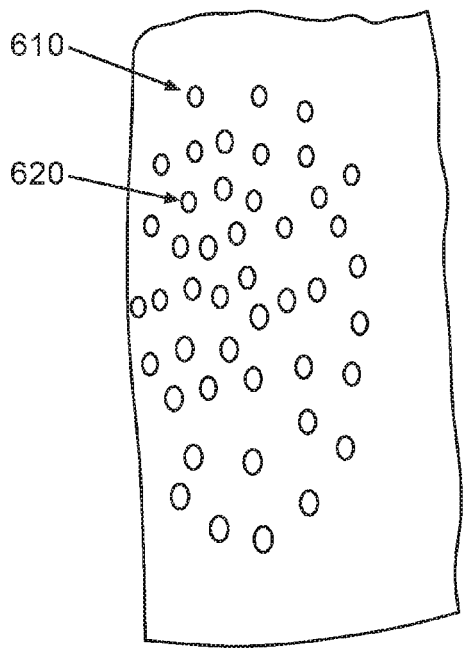
FIG. 11 shows a section of the diffusion layer with holes.

FIG. 10 presents a dark protective insert 700 made of thick water proof material such as rubber or neoprene.

Figure 12:
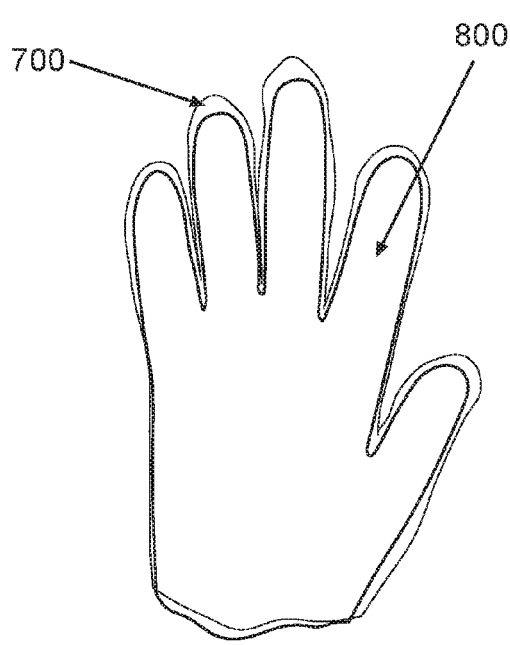
FIG. 12 shows a mock hand covered by a protective insert.

FIG. 12 presents a clear protective insert 700 surrounding a mock hand 800 (used for demonstration purposes only) where the protective insert 700 is made of thin water proof material such as plastic.

Overall the protective insert 700 serves to isolates the user's hand from the first and second fluids (such as water and shampoo) and allows fluids to be optimally directed to the fluid diffusion layer and specifically the bristle support layer holes 620 and then outward to the hair and skin of the pet being groomed.

It is understood the components of the instant invention are constructed from materials suitable to the applicable usage environment.

While various embodiments of the present invention may be shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A pet grooming glove comprising:
    a first outer layer fully enclosing a hand of a user, said first outer layer sealably attached to a second outer layer;
    a porous region positioned on said second outer layer in the palm area of the hand of the user,
    at least one fluid supply port positioned in said at least one outer layer, said at least one fluid supply port providing a fluid communication path which extends to the porous region in said second layer in the palm area of the hand of the user and at least one removable supplemental fluid supply port positioned through in the glove, the at least one removable supplemental fluid supply port being in fluid contact with the at least one fluid supply port,
    wherein said at least one fluid supply port is configured to receive fluid, and
    wherein said fluid is dispensed through the fluid communication path and through the porous region in said second layer thereby providing fluid for grooming a pet.

2. The pet grooming glove of claim 1 wherein the at least one removable supplemental fluid supply port includes at least one chamber for holding fluids and for placing those fluids in communication with the fluid injected into the at least one fluid supply port.

3. The pet grooming glove of claim 1 wherein the at least one removable supplemental fluid supply port includes multiple chambers for holding fluids and for placing those fluids in communication with the fluid injected into the at least one fluid supply port.

4. The pet grooming glove of claim 3 wherein the at least one removable supplemental fluid supply port multiple chambers are selectively chosen to place fluids in fluid communication with fluid provided by at least one fluid supply port.

5. The pet grooming glove of claim 1 wherein the second outer layer is positioned in the area of the back of a user's hand and the at least one removable supplemental fluid supply port is positioned on the second outer layer.

6. The pet grooming glove of claim 1, wherein the fluids are water and shampoo.

7. The pet grooming glove of claim 1, wherein the at least one fluid supply port is configured to be connected to a water hose.

8. The pet grooming glove of claim 1, wherein the at least one fluid supply port is attached perpendicularly or approximately perpendicularly to said first outer layer.

9. The pet grooming glove of claim 1, wherein said second outer layer includes bristles.

10. The pet grooming glove of claim 9, wherein said bristles extend over the entire surface area of said second outer layer.

11. The pet grooming glove of claim 10, wherein said bristles are configured to be on a removable bristle pad.

12. A pet grooming system comprising:
    a pet grooming glove according to claim 1;
    a valve; and
    a hose,
    wherein the valve has two inputs, such that water and soap are separately able to be controlled to enter the pet grooming glove.

* * * * *